(12) United States Patent
Hamann et al.

(10) Patent No.: US 9,241,449 B2
(45) Date of Patent: *Jan. 26, 2016

(54) IRRIGATION SYSTEM

(71) Applicant: International Business Machines Corporation, Armonk, NY (US)

(72) Inventors: Hendrik F. Hamann, Yorktown Heights, NY (US); Levente L. Klein, Tuckahoe, NY (US); Sergio A. Bermudez Rodriguez, Hudson, NY (US); Michael A. Schappert, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/968,024

(22) Filed: Aug. 15, 2013

(65) Prior Publication Data

US 2014/0252103 A1    Sep. 11, 2014

Related U.S. Application Data

(63) Continuation of application No. 13/792,751, filed on Mar. 11, 2013.

(51) Int. Cl.
*A62C 37/20* (2006.01)
*A01G 25/02* (2006.01)
(Continued)

(52) U.S. Cl.
CPC ............... *A01G 25/02* (2013.01); *A01G 25/16* (2013.01); *A01G 25/162* (2013.01); *B05B 12/04* (2013.01)

(58) Field of Classification Search
CPC ... A01G 25/165; A01G 25/162; A01G 25/02; A01G 25/023; A01G 27/003; A01G 25/16; B05B 12/02; B05B 12/04

USPC ......... 239/200–210, 266, 267, 556, 557, 562, 239/563, 565, 574, 571

See application file for complete search history.

(56) References Cited

U.S. PATENT DOCUMENTS

| 3,685,735 A | 8/1972 | Foster |
| 3,797,741 A * | 3/1974 | Spencer .......................... 239/11 |

(Continued)

FOREIGN PATENT DOCUMENTS

CN    101449654 B    1/2011

OTHER PUBLICATIONS

R. W. Coates et al., •Precision Irrigation in Orchards: Development of a Spatially Variable Microsprinkler System,• Information and Technology for Sustainable Fruit and Vegetable Production, FRUTIC •05, Sep. 16, 2005, 14 pages.

(Continued)

*Primary Examiner* — Arthur O Hall
*Assistant Examiner* — Juan C Barrera
(74) *Attorney, Agent, or Firm* — Cantor Colburn LLP; Vazken Alexanian

(57) ABSTRACT

A method of operating a drip irrigation system is provided and includes providing drip irrigation lines aside a diverter line with T-junctions interleaved between adjacent ones of the drip irrigation lines and each T-junction including a three-way line coupled to the diverter line, a check valve operably disposable between the three-way line and a downstream end of an upstream one of the drip irrigation lines to permit fluid flow in only a forward direction and a controllable valve operably disposable between the three-way line and an upstream end of a downstream one of the drip irrigation lines.

13 Claims, 6 Drawing Sheets

(51) Int. Cl.
*B05B 12/04* (2006.01)
*A01G 25/16* (2006.01)

(56) References Cited

U.S. PATENT DOCUMENTS

| | | | |
|---|---|---|---|
| 3,917,166 A | 11/1975 | Hildebrandt et al. | |
| 3,917,174 A | 11/1975 | Hildebrandt et al. | |
| 4,209,131 A | 6/1980 | Barash et al. | |
| 4,317,539 A | 3/1982 | Pollock | |
| 4,423,838 A | 1/1984 | Dinur | |
| 4,545,396 A | 10/1985 | Miller et al. | |
| 4,609,014 A | 9/1986 | Jurjevic et al. | |
| 4,673,128 A * | 6/1987 | Keller et al. | 239/1 |
| 4,682,730 A | 7/1987 | Smeyers | |
| 5,102,259 A | 4/1992 | York | |
| 5,111,996 A | 5/1992 | Eckstein | |
| 5,134,961 A | 8/1992 | Giles et al. | |
| 5,196,125 A * | 3/1993 | O'Brien | 210/747.1 |
| 5,228,469 A | 7/1993 | Otten et al. | |
| 5,294,058 A | 3/1994 | Einav | |
| 5,487,455 A | 1/1996 | Feigel | |
| 5,527,295 A | 6/1996 | Wing | |
| 5,785,246 A | 7/1998 | King et al. | |
| 6,095,189 A | 8/2000 | Ben-Shalom | |
| 6,314,979 B1 | 11/2001 | Lips | |
| 6,490,505 B1 | 12/2002 | Simon et al. | |
| 6,540,158 B1 | 4/2003 | Vered | |
| 6,558,078 B2 * | 5/2003 | Sowry et al. | 405/37 |
| 6,713,021 B1 | 3/2004 | Shvets | |
| 6,749,136 B1 | 6/2004 | Wilson et al. | |
| 6,875,707 B2 | 4/2005 | Moore et al. | |
| 6,978,794 B2 | 12/2005 | Dukes et al. | |
| 7,018,134 B2 | 3/2006 | Sowry et al. | |
| 7,108,205 B1 | 9/2006 | Hashimshony et al. | |
| 7,337,983 B1 | 3/2008 | Boice | |
| 7,338,475 B2 | 3/2008 | Brown | |
| 7,455,073 B2 | 11/2008 | Shukhmin et al. | |
| 2003/0107013 A1 | 6/2003 | Pappo et al. | |
| 2004/0222325 A1 | 11/2004 | Regev | |
| 2010/0129154 A1 | 5/2010 | Cox | |
| 2011/0174893 A1 | 7/2011 | Allan et al. | |
| 2012/0041360 A1 | 2/2012 | Gerg et al. | |
| 2013/0074400 A1 | 3/2013 | Roess et al. | |

OTHER PUBLICATIONS

R. W. Coates et al.; "Design of a System for Individual Microsprinkler Control;" Transactions of the ASABE, vol. 49, No. 6, 21006; pp. 1963-1970.

R. W. Coates et al., "Control of individual microsprinklers and fault detection strategies," Precision Agriculture, vol. 7, No. 2, 2006, pp. 85-99.

R. W. Coates et al., "Wireless Network for Individual Emitter Control in Irrigation," VDI BERICHTE, vol. 1958, 2006, pp. 209-214.

King et al., "A Variable Flow Rate Sprinkler for Site-Specific Irrigation Management," Applied engineering in agriculture, vol. 20, No. 6, 2004, pp. 765-770.

R. J. Smith et al., "Review of precision irrigation technologies and their application," National Centre for Engineering in Agriculture, University of Southern Queensland, Toowoomba, NCEA Publication 1003017/1, Nov. 2010, 104 pages.

Yanglin et al., "Experimental and numerical study of flow behavior in electromagnetic valve", 7th International Conference on System Simulation and Scientiic Computing, ICSC 2008, pp. 970-973.

International Search Report issued in PCT/US2014/011582 on May 20, 2014, 6 pgs.

Written Opinion issued in PCT/2US2014/011582 on May 20, 2014, 4 pgs.

Written Opinion issued in PCT/US2014/011790, May 9, 2014; 3 pages.

International Search Report issued in PCT/US2014/011790, May 9, 2014; 8 pages.

International Search Report issue in PCT/US14/11388, May 13, 2014, 7 pages.

Written Opinion issued in PCT/US14/11388, May 13, 2014, 5 pages.

\* cited by examiner

IRRIGATION SYSTEM

CROSS REFERENCE TO RELATED APPLICATION

This application is a Continuation application of U.S. Non-Provisional application Ser. No. 13/792,751, which was filed Mar. 11, 2013. The entire contents of U.S. application Ser. No. 13/792,751 are incorporated herein by reference.

BACKGROUND

The present invention relates to an irrigation system and, more specifically, to an irrigation system including a diverter line and drip irrigation lines.

Current drip irrigation systems are often equipped with pressure compensated emitters that can deliver a certain amount of water to nearby areas based on the fabrication characteristics of the emitters. Typically, the emitters will have a watering rate of 0.5, 1 or 2 gallons per hour delivery. The amount is set in the fabrication process or they can be set manually in the field. This can present problems, however, because industry frequently demands that drip irrigation systems be able to dynamically adjust the amount of water that is delivered to a specific location based on real time information (satellite imagery, field deployed soil moisture sensor, thermal imagery) of the water absorbed/transpired by canopy and water evaporation from soil or soil water retention properties.

Current approaches to the problem of using emitters with a predefined watering rate in a drip irrigation system in which dynamic adjustments are required rely on delivery of the same amount of water in every location where the amount of water is defined as the upper amount required by the most water demanding spot. The inherent differences in soil properties and crop characteristics can thus lead to overwatering in many locations based on such uniform water delivery. Potentially, different rate emitters can be installed in different locations but temporal changes in the irrigation schedule does not permit dynamic adjustments over time.

SUMMARY

According to one embodiment of the present invention, an irrigation system including a diverter line is provided. The system includes drip irrigation lines, T-junctions interleaved between adjacent drip irrigation lines, each T-junction including a three-way line coupled to the diverter line, a check valve operably disposable between the three-way line and a downstream end of an upstream one of the drip irrigation lines to permit fluid flow in only a forward direction and a controllable valve operably disposable between the three-way line and an upstream end of a downstream one of the drip irrigation lines. The controllable valve is operable to permit fluid flow in only the forward direction and to prevent the fluid flow.

According to another embodiment, a drip irrigation system including a diverter line is provided. The system includes a plurality of drip irrigation lines arranged aside the diverter line, a plurality of T-junctions interleaved between adjacent ones of the plurality of drip irrigation lines, each T-junction including a three-way line having a first leg fluidly coupled to the diverter line, a second leg configured to be coupled to a downstream end of an upstream one of the plurality of drip irrigation lines and a third leg configured to be coupled to an upstream end of a downstream one of the plurality of drip irrigation lines, a check valve operably disposable between the second leg and the downstream end of the upstream one of the plurality of drip irrigation lines to permit fluid flow in only a forward direction and a controllable valve operably disposable between the third leg and the upstream end of the downstream one of the plurality of drip irrigation lines. The controllable valve is operable in a first mode whereby the controllable valve permits fluid flow in only the forward direction and in a second mode whereby the controllable valve prevents the fluid flow.

According to yet another embodiment, a method of operating a drip irrigation system is provided. The method includes providing drip irrigation lines aside a diverter line with T-junctions interleaved between adjacent ones of the drip irrigation lines and each T-junction including a three-way line coupled to the diverter line, a check valve operably disposable between the three-way line and a downstream end of an upstream one of the drip irrigation lines to permit fluid flow in only a forward direction and a controllable valve operably disposable between the three-way line and an upstream end of a downstream one of the drip irrigation lines, and opening and closing each of the controllable valves.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
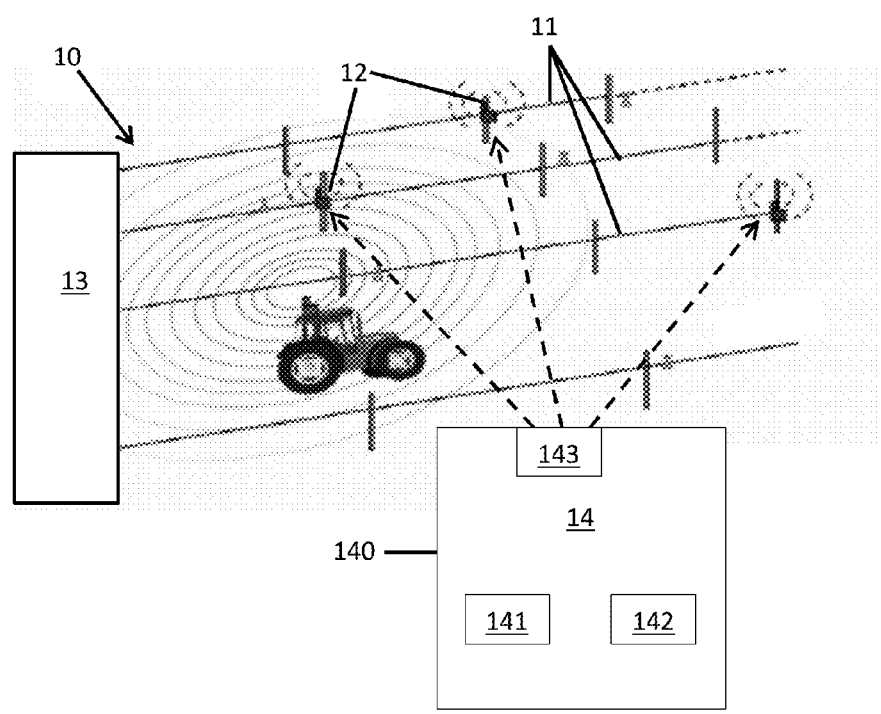
FIG. 1 is a schematic view of a drip irrigation system.

A controllable emitter is provided. The controllable emitter can be deployed in, for example, a drip irrigation system and allows a variable of amount of water to be delivered to a specific location of the drip irrigation system over a period of time. The controllable emitter includes a solenoid coil slid over a tubular element that drips the water. The upper part of the tubular element is normally blocked by a magnetic stopper in the shape of a sphere or a cone. When a current is applied to the solenoid coil, the solenoid coil creates a magnetic field that forces the magnetic stopper to move out of the blocking position and thereby allows water to flow through the tube. The current applied to the solenoid coil can be direct current (DC), such that the magnetic stopper may be displaced continuously, or alternating current (AC), such that the magnetic stopper may be displaced periodically. The solenoid coil may be electrically coupled to an electronic circuit that contains a microcontroller that can receive a command from an external device and a memory unit on which schedule and timing information of the magnetic stopper movement is stored. Each controllable emitter of a given drip irrigation system can be addressed individually and a specific schedule can be uploaded wirelessly or over a wireless network into the memory unit such that each emitter can have an independent schedule. By keeping the magnetic stopper in a position where water can flow through the tubular element and timing the period it allows the water to flow combined with a feedback mechanism that measures water flow, the amount of delivered water can be determined by the microcontroller. The system will thus deliver variable amounts of water to any location subject to the drip irrigation system by uploading an individual watering schedule.

A system and method for applying variable amounts of water or fertilizer over a region, such as agricultural land, using a drip irrigation system is also provided. The system and method include installation of drip irrigation lines along a diverter line such that the water used for irrigation is allowed or restricted to pass through the lateral drip irrigation line using a T-junction. The T-junction has a solenoid valve and a check valve. The lateral drip irrigation lines can be assembled in variable length segments and the filling of the drip irrigation lines with water can be controlled using the T-junction and the diverter line. By controlling the solenoid valves, an amount of fluid, fertilizer or chemicals delivered to an associated area can be controlled by adjusting the time the solenoid valves are open and knowing the number of corresponding emitters and their respective emission rates.

In addition, an automated method of controlling valves to apply variable amounts of water or fertilizer over an extended agricultural land is provided and uses a minimized modification to an existing dripline system. The method takes advantage of the concept that the same amount of water from a central line can be delivered either by using emitters/nozzles that have higher emission rates (gallons per hour) and requiring less watering time or extending the watering time of emitter/nozzles that have lower emission rates. The approach proposes to install on/off solenoid valves along a dripline to control water flow and using emitters that have different emission rates along the line. The higher emission rate emitters/nozzles are positioned farther from the main water distribution line while smaller emission rate emitters/nozzles will be closer to the main water distribution line. The emitters are inserted such that their emission rate increases from low to high along the line with the low emission rate emitters being positioned closer to the main water distribution line. Thus, by controlling the solenoid valve open/closed position for different periods of time, the amount of water delivered to a specific location can be increased or decreased.

In all embodiments described above, power can be derived from a power line or form solar paneling. Certain aspects of the timing may be affected and determined by the availability and costs of such power.

With reference now to FIG. 1, an exemplary drip irrigation system 10 is provided. The drip irrigation system 10 may be deployed over a relatively large area, such as a farm or a field that requires a predefined amount of water delivery above and beyond the amount provided as atmospheric accumulation. The drip irrigation system 10 may include multiple drip lines 11, a plurality of emitters that can be controllable emitters 12 disposed along each of the multiple drip lines 11, a fluid source 13 and a control station 14. Each of the multiple drip lines 11 is fluidly coupled to the fluid source 13 wherein the fluid source 13 provides a fluid, such as water, to each of the multiple drip lines 11 as a pressurized fluid.

The provision of pressurized fluid to each of the multiple drip lines 11 may, in some cases, be pressure controlled while the plurality of emitters (i.e., the controllable emitters 12) can be pressure compensated.

The control station 14 may be embodied as a computing device 140 having a processing unit 141, memory units 142 and an actuator unit 143. The processing unit 141 may be electrically coupled via the actuator unit 143 to each of the plurality of controllable emitters 12 distributed across the field to thereby provide for effective local control commands to the controllable emitters 12. The processing unit 141 is thus configured to cause each of the plurality of controllable emitters 12 to be actuated and to allow the pressurized fluid to drip independently of one another. The memory units 142 have instructions stored thereon, which, when executed, cause the processing unit 141 to operate in accordance with the methods described herein.

Figure 2A:
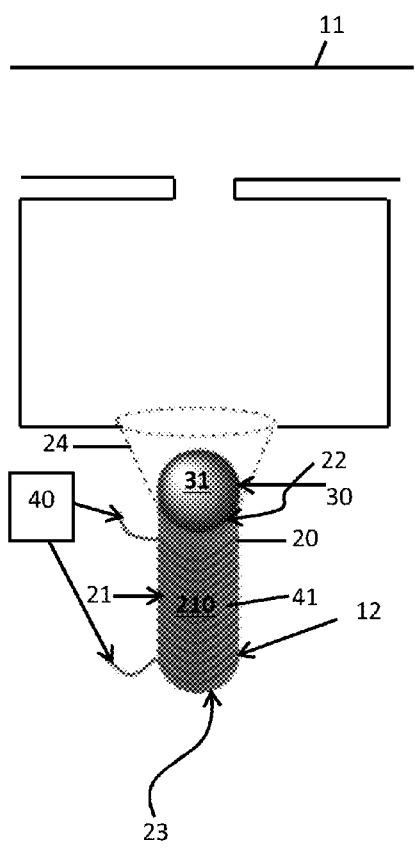
FIG. 2A is a side view of a controllable emitter with a solenoid coil and a magnetic stopper in accordance with embodiments.
Figure 2B:
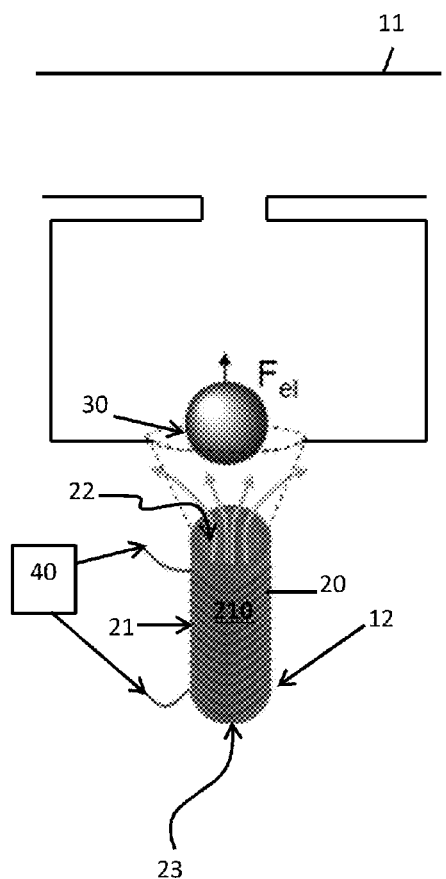
FIG. 2B is a side view of a controllable emitter with a solenoid coil and a magnetic stopper in accordance with embodiments.

With reference to FIGS. 2A and 2B, each of the plurality of controllable emitters 12 may include a container 20, which is fluidly coupled to the corresponding drip line 11, a magnetic stopper 30 and a controllable actuator 40. The container 20 includes a body 21 that is formed as a tubular element to define an interior 210, an inlet 22 through which the pressurized fluid is receivable in the interior 210 from the corresponding drip line 11 and an outlet 23 through which the pressurized fluid is exhaustible from the interior 210. As shown in FIGS. 2A and 2B, the corresponding drip line 11 may be disposed in a substantially horizontal orientation (i.e., it extends along a plane of the irrigated region) wherein the container 20 extends in a substantially vertical (i.e., downward) orientation.

The magnetic stopper 30 is normally disposable in a first position (see FIG. 2A) such that the magnetic stopper 30 prevents a flow of the pressurized fluid through the inlet 22 and the outlet 23. The magnetic stopper 30 is also actively disposable in a second position (see FIG. 2B) such that the magnetic stopper 30 permits the flow of the pressurized fluid through the inlet 22 and the outlet 23. That is, in the embodiment of FIGS. 2A and 2B, the magnetic stopper 30 experiences a downward pressure due to the pressurized fluid and a gravitational force in the substantially vertical direction. Thus, with the container 20 extending substantially vertically downwardly from the corresponding drip line 11, the magnetic stopper 30 normally sits in the inlet 22. In this condition, the magnetic stopper 30 has sufficient size (i.e., diameter) to block the flow of the pressurized fluid through the inlet 22 and the outlet 23. However, when the magnetic stopper 30 is urged to move toward the second position, the magnetic stopper 30 ceases to block the flow of the pressurized fluid through the inlet 22 and the outlet 23.

Figure 3:
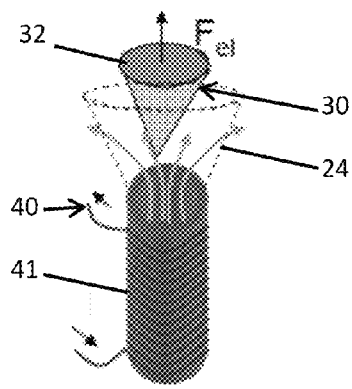
FIG. 3 is a perspective view of a magnetic stopper in accordance with alternative embodiments.

With reference to FIGS. 2A, 2B, 3 and 4, the magnetic stopper 30 may be provided in various shapes and sizes. For example, as shown in FIGS. 2A and 2B, the magnetic stopper 30 may be a spherical ball-shaped element 31 formed of ferro-magnetic material. As another example, as shown in FIG. 3, the magnetic stopper 30 may be a conical element 32 formed of ferro-magnetic materials. In each case, the container 20 may further include a porous support element 24 that is coupled to the body 21 at the inlet 22. The porous support element 24 may be substantially frusto-conical and serves to maintain a lateral position of the magnetic stopper 30 when the magnetic stopper 30 is urged to move toward the second position so that the magnetic stopper 30 can be reliably returned to the first position.

Figure 4:
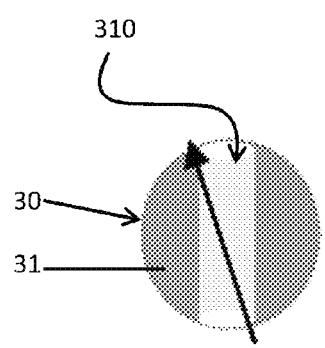
FIG. 4 is a schematic illustration of a magnetic stopper in accordance with further alternative embodiments.

As yet another example, as shown in FIG. 4, the magnetic stopper 30 may be a spherical ball-shaped element 31, which is formed to define a bore-hole 310. The bore-hole 310 extends from one side of the spherical ball-shaped element 31 to the other and may be sufficiently sized to sit in the inlet 22. In this embodiment, the first position of the magnetic stopper 30 is characterized in that the axis of the bore-hole 310 is miss-aligned with respect to the axis of the container 20 and the magnetization of the material of the magnetic stopper 30 such that flow of the pressurized fluid through the inlet 22 and the outlet 23 is blocked. Due to the position and sizing of the spherical ball-shaped element 31 with the bore-hole 310, the magnetic stopper normally assumes the first position. The second position is characterized in that the axis of the bore-hole 310 is aligned with respect to the axis of the container 20 such that the flow through the inlet 22 and the outlet 23 is permitted.

The controllable actuator 40 is configured to generate a magnetic field, which is operable to urge the magnetic stopper 30 to move from the first position to the second position (as in the embodiments of FIGS. 2A, 2B and 3) or to urge the magnetic stopper to rotate from the first position to the second position (as in the embodiment of FIG. 4). The rotation is caused by the interplay between the fluidic forces that tries to move water through the bore-hole 310 and the electro-magnetic force that tries to align the stopper magnetization with the magnetic field created by the solenoid coil 41. In accordance with embodiments, the controllable actuator 40 may include a solenoid coil 41, which is formed of a conductive element that is electrically coupled to the processing unit 141. The solenoid coil 41 is supportively coupled to the container 20 and, where the body 21 of the container 20 is formed as the tubular element, the solenoid coil 41 may be slid around the outer circumference of the body 21.

With this construction, the processing unit 141 of the control station 14 may be configured to apply current to the solenoid coil 41. This current generates the above-noted magnetic field, which interacts with the magnetic stopper 30 to cause the magnetic stopper to move (or rotate) from the first position to the second position. The processing unit 141 may execute this routine in accordance with a predefined schedule or current conditions (i.e., during a dry spell, the amount of time the magnetic stopper 30 is urged toward the second position is increased so as to permit a larger amount of the pressurized fluid to flow through the outlet 23). Moreover, the current applied to the solenoid coil 41 may be provided as DC or AC. In the former case, the magnetic stopper 30 is continuously urged toward the second position whereas, in the latter case, the magnetic stopper 30 oscillates between the first and second positions.

Figure 5:
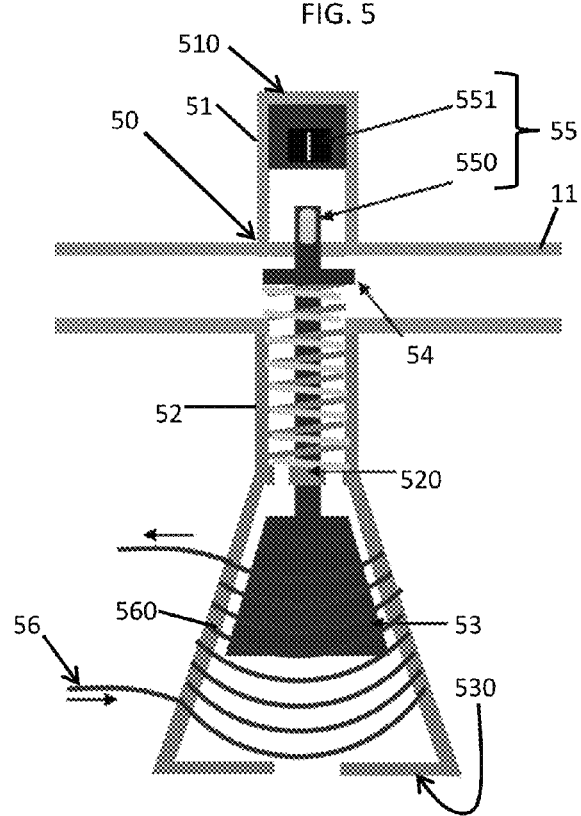
FIG. 5 is a side view of a controllable emitter with a solenoid coil and a magnetic stopper in accordance with alternative embodiments.
Figure 6:
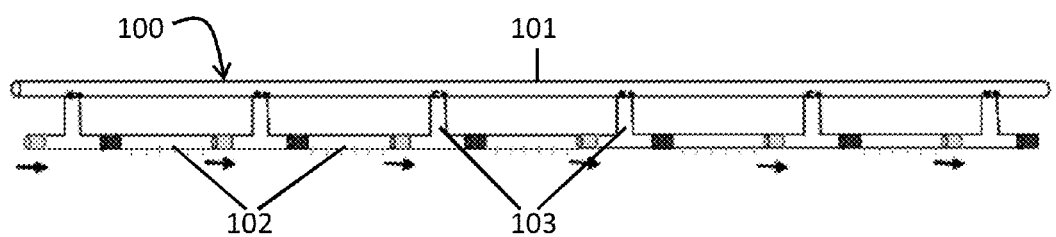
FIG. 6 is a side schematic view of an irrigation system in accordance with alternative embodiments.

In accordance with alternative embodiments and, with reference to FIG. 5, a controllable emitter with variable rate emitter feedback (CEVREF) 50 is provided. In this case, the CEVREF 50 includes first and second containers 51 and 52 disposed on opposite sides of the corresponding drip line 11. Again, the corresponding drip line 11 may be disposed substantially horizontally as described above with the first and second containers 51 and 52 disposed substantially vertically upwardly and downwardly from the corresponding drip line 11, respectively. The first and second containers 51 and 52 are each provided as tubular elements, but the first container 51 may be closed at its distal end 510 whereas the second container 52 is open at its distal end 520. The CEVREF 50 further includes a chamber 53, a spring-loaded piston 54 and a linear displacement sensor 55. The chamber 53 is fluidly coupled to the open end 520 of the second container 52 and has a lower surface 530 with an opening defined therein. The spring loaded piston 54 is operably disposed in the CEVREF 50 to be movable in the substantially vertical direction with respect to the corresponding drip line 11.

The linear displacement sensor 55 is coupled to both the first container 51 and the spring-loaded piston 54 and is configured to determine a vertical position of the spring-loaded piston 54. In accordance with embodiments, the linear displacement sensor 55 may include an encapsulated magnet 550, which is encapsulated in the spring-loaded piston 54 and a magnetic field sensitive sensor, such as a giant magneto-resistive (GMR) sensor 551.

With this construction, the CEVREF 50 is controllable in accordance with the readings of the linear displacement sensor 55. That is, as the pressurized fluid flows through the corresponding drip line 11, the pressurized fluid will push down on the spring-loaded piston 54. Thus, the higher the flow rate of the pressurized fluid, the greater the linear displacement of the spring-loaded piston 54 and the further the encapsulated magnet 550 will be pulled from the GMR 551. An output signal of the GMR 551 may be receivable by the control station 14 and will be calibrated as a function of sensor-magnet position. A drip rate of the CEVREF 50 is thus controllable by varying the pressure of the fluid in the corresponding drip line 11.

In accordance with further embodiments, the spring-loaded piston 54 may be formed of magnetic material and the CEVREF 50 may further include an additional controllable actuator 56. The controllable actuator 56 may be provided as a solenoid coil 560 that can be wrapped or slid around the outer circumference of the chamber 53. As described above, the processing unit 141 can apply DC or AC to the solenoid coil 56 to urge the spring-loaded piston 54 formed of magnetic material toward the open end 520 of the second container 52 or the lower surface 530. Such effect can either block the flow of the pressurized fluid out of the chamber 53 or encourage an increased amount of the pressurized fluid to flow out of the chamber 53.

In accordance with further aspects of the invention and, with reference to FIGS. 6-8A and 8B, a drip irrigation system 100 is provided. The drip irrigation system 100 includes a diverter line 101 and drip irrigation systems that are joined together at the beginning and at the end of the drip irrigation line. The drip irrigation system 100 further includes drip irrigation lines 102, which are similar to the drip lines 11 described above, and T-junctions 103. The drip irrigation lines 102 are disposable substantially in parallel with the diverter line 101 and are formed to define irrigation segments along their respective longitudinal lengths. The pressurized fluid contained in the diverter line 101 is provided to the drip irrigation lines 102 and flows outwardly through irrigation holes defined in the drip irrigation lines 102. In some cases, each of the drip irrigation lines 102 may have lengths that can be adjusted according to spatial resolution of sensing zones.

Figure 7:
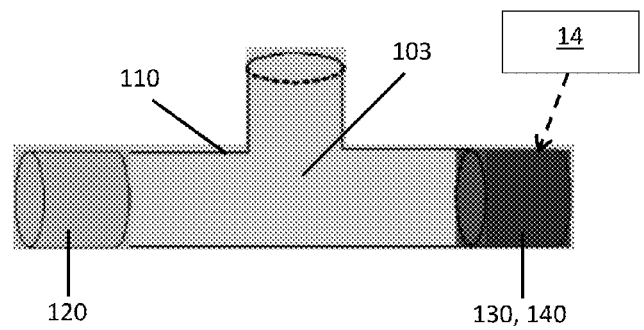
FIG. 7 is an enlarged side view of a T-junction of the irrigation system of FIG. 6.

The T-junctions 103 are each interleaved between adjacent ones of the drip irrigation lines 102. As shown in FIG. 7, each T-junction 103 includes a three-way line 110, which is coupled to the diverter line 101, a check valve 120 and a controllable valve 130. The check valve 120 is operably disposable between the three-way line 110 and a downstream end of an upstream one of the drip irrigation lines 102 to permit fluid flow in only a forward direction (see the arrows in FIG. 6). As such, the check valve 120 prohibits fluid flow in the reverse direction wherein fluid can only flow through the drip irrigation lines 102 in the forward direction. The check valve 120 can include a simple mechanical flap that is opened/closed by fluid pressure or a spring-loaded nozzle that is actuated by the pressure of the fluid in the drip irrigation line 102. The check valve 120 may also include a solenoid valve that is selectively opened/closed in a manner similar to the controllable valve 130 as discussed below. In any case, the check valve 120 is complemented by the controllable valve 130 that is selectively opened/closed as described below.

The controllable valve 130 is operably disposable between the three-way line 110 and an upstream end of a downstream one of the drip irrigation lines 102. In that position, the controllable valve 130 is operable in a first mode and a second mode. In the first mode, the controllable valve 130 permits fluid flow in only the forward direction (as illustrated by the arrows in FIG. 6). In the second mode the controllable valve 130 prevents the fluid flow in the forward direction.

In accordance with embodiments, the controllable valve 130 of each of the T-junctions 103 may include a solenoid valve 140 where the solenoid valve 140 is operably coupled to, for example the control station 14 described above. In these cases, the control station 14 is configured to apply a current to the solenoid valve 140 or not apply the current to the solenoid valve 140 such that the controllable valve 130 operates in the first mode or the second mode, respectively. The determination of whether to apply the current or not may be made by the control station 14 based on a predefined irrigation schedule defined in accordance with a predefined temporal resolution and/or historical data or current atmospheric conditions. In some cases, the control station 14 can issue commands to individual controllable valves 130 to hereby control an amount of fluid delivered to an area proximate to the corresponding controllable valves 130.

Each of the solenoid valves 140 may be configured to acknowledge receipt of a command to open or close from the control station 14. In addition, each of the solenoid valves 140 may be configured to report back to the control station 14 that a received command was performed or executed. Along with signals from sensors relating to current atmospheric and soil condition, these reports from the solenoid valves 140 may be employed by the control station 14 in a closed loop feedback control system.

Figure 8A:
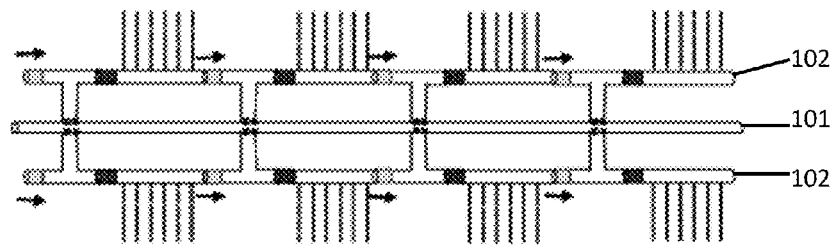
FIG. 8A is a side schematic view of an irrigation system in accordance with further alternative embodiments.
Figure 8B:
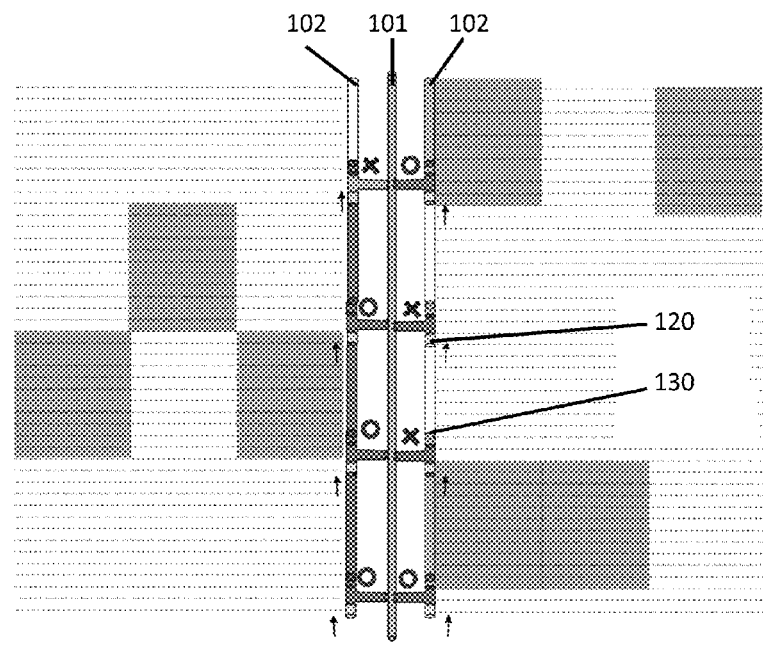
FIG. 8B is a top down view of an irrigation system.

In accordance with further embodiments and, as shown in FIGS. 8A and 8B, the drip irrigation lines 102 may be disposable on both sides of the diverter line 101 such that additional area can be covered by the drip irrigation system 100. In these embodiments, multiple ones of the T-junctions 103 may be disposable at similar axial locations along the diverter line 101 and two or more drip irrigation lines 102 may be coaxial with one another at each of those similar axial locations. In the particular embodiment illustrated in FIG. 8A, the irrigation holes of each of the drip irrigation lines 102 at any one axial location of the diverter line 101 may be oriented in opposite directions so as to spray pressurized fluid over twice the proximal area.

In any case, for any section of irrigated area associated with a particular drip irrigation line 102, pressurized fluid will flow outwardly through the irrigation holes only when the controllable valve 130 is opened. Thus, an amount of irrigation in that section is controllable by adjusting the time the controllable valve 130 is open and knowing the number of emitters per segment and their respective emission rates. Moreover, one or more controllable valves 130 can be opened and closed at the same time such that they can have a common control cycle. In addition, the drip irrigation lines 102 may be moved across a field and the controllable valves 130 at various sections can be activated or deactivated (i.e., controllable valves 130 are identified as being activated where they have an "O" and as being deactivated where they have an "X", as shown in FIG. 8B) at various times and for various time periods. In this way, various sections of the field can be irrigated at various intervals and by amounts of fluid that are appropriate for current conditions at those sections.

At the upstream and downstream ends of the drip irrigation lines 102, the drip irrigation lines are coupled to the diverter line 101 and a single controllable (i.e., solenoid) valve may be provided at the far end of the diverter line 101 and would be normally closed. These valves will stop water from escaping from the drip irrigation lines 102 but will be opened when the system has to be flushed to be cleaned from debris and organic material. For flushing, a command is issued to all of the controllable valves 130 (i.e., all of the solenoid valves 140) to stay opened and water is pumped at high pressure through the drip irrigation lines 102.

Figure 9A:
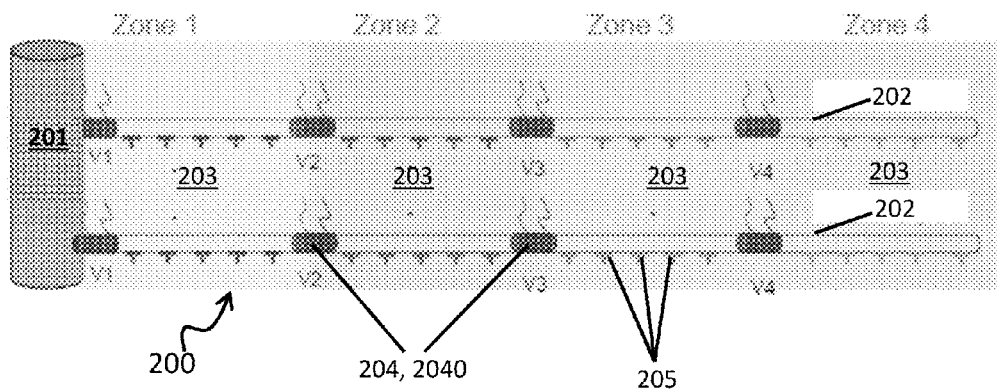
FIG. 9A is a schematic view of an irrigation system in accordance with alternative embodiments.
Figure 9B:
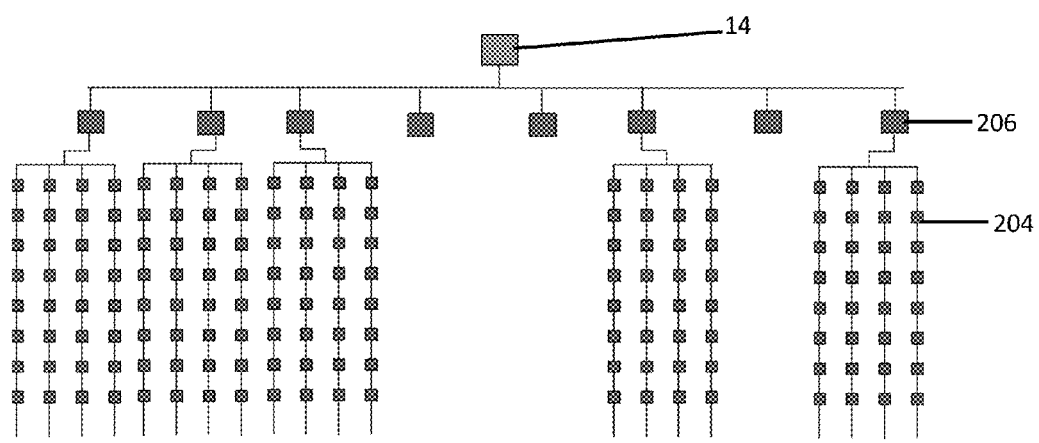
FIG. 9B is a schematic view of a hierarchy of irrigation system control in accordance with embodiments.

With reference to FIGS. 9A and 9B, irrigation lines such as the main irrigation lines 11 and 101 described above are commonly fitted with replaceable nozzles or emitters (hereinafter referred to as "emitters") that are pressure compensated and can have the same drip rates. The typical drip rate (hereinafter referred to as "emission rate") would be between about 0.25 gph (gallons per hour) up to about 8 gph. The amount of water delivered by a system using such features can be calculated by multiplying the emission rate with time. Thus, a 2 gph emitter that is operated for 2 hours will emit the same amount of fluid as a 1 gph emitter that is operated for 4 hours. As such, the same amount of fluid can be delivered by choosing a higher emission rate emitter that is operated for a short time or by operating a lower emission rate emitter for a longer time.

In accordance with aspects of the invention, an irrigation system 200 is provided. The system 200 includes a main water supply line 201 and one or more lateral driplines 202 fluidly coupled to the main water supply line 201. Each of the one or more driplines 202 is divided into segments (or zones) 203 that are separated from one another by a controllable valve 204, such as a pressure regulating or solenoid valve 2040. The controllable valve 204 can be actuated (i.e., turned on and off) by a voltage pulse issued from control station 14 similar to the manner described above.

As shown in FIG. 9, each of the one or more driplines 202 is equipped with a plurality of emitters 205 such that each dripline 202 has a group of emitters 205 in each zone. Each emitter 205 is activated when the controllable valve 204 associated with the corresponding zone is actuated or turned on. The one or more driplines 202 are arranged such that groups of emitters 205 for each one of the driplines 202 may be provided in each zone.

The one or more driplines 202 are further arranged such that higher rate emitters 205 are disposed toward the end of the corresponding dripline 202, which is remote from the main water supply line 201. The lower emission rate emitters 205 are then disposed closer to the main water supply line 201. Thus, in zone 4, the emitters 205 have a high emission rate, in zone 3, the emitters 205 have a medium high emission rate, in zone 2, the emitters 205 have a medium low emission rate and, in zone 1, the emitters 205 have a low emission rate. As such, in order to maintain a uniform amount of fluid delivered to zones 1-4, the emitters 205 in zone 4 need to be activated for the shortest time, the emitters 205 in zone 3 need to be activated for the next shortest time, the emitters 205 in zone 2 need to be activated for the next shortest time after that and the emitters 205 in zone 1 need to be activated for the longest time. For this to occur, the controllable valves 204 (V4) between zones 3 and 4 need to be opened for the shortest time, the controllable valves 204 (V3) between zones 2 and 3 need to be opened for the next shortest time, the controllable valves 204 (V2) between zones 1 and 2 need to be opened for the shortest time after that and the controllable valves 204 (V1) between the main irrigation line 201 and zone 1 need to be opened for the longest time.

In some cases, it is to be understood that it will not be necessary or desirable to provide a uniform amount of fluid to each of the zones 1-4. In such cases, time multiplexing may be employed to vary an amount of fluid delivered to some of the zones but not others (i.e., to provide a relatively large amount of fluid to a central area and relatively small amounts of fluid to outer areas). For example, if the controllable valves 204 in zones 1-4 have respective emission rates of 0.5, 1, 2, 4 gph, "open" time units of 8, 4, 2, 1 would be allocated to the controllable valves 204 in order to have a same amount of water delivered to zones 1-4. Here, as noted above, the amount of time the lowest-rate controllable valve 204 is kept open is the longest in the system since fluid has to flow through that segment.

To put twice as much fluid in zone 2 with the same controllable valve 204 configuration noted above, requires a time sequence 8, 8, 2, 1. If, however, it is desired that three times as much fluid in zone 2, it may be necessary to decrease the emission rate of the controllable valve 204 of zone 1 to 0.25 gph. Now, the sequence of controllable valves 204 will be 0.25, 1, 2, 4 and the "open" timing would be 16, 12, 2, 1.

In accordance with embodiments, different or multiple driplines 202 can be grouped together and controlled to thereby create "variable rate irrigation" zones. In such an approach, the "variable rate irrigation" zones can be created continuously based on information provided by monitoring stations that would delineate the "variable rate irrigation" zones and specify the amount of fluid needed in each corresponding location. Such feedback information can be provided by soil moisture sensors that would monitor the water content in the soil, satellite sensing to monitor the evapotranspiration of the associated canopy or canopy sensors to measure local water content. Any of the sensing approaches will have a spatial and temporal resolution determined by the detection methods and the resolution will be matched by the length of drip lines segments and by updating the irrigation schedule. For common satellite imagery like LANDSAT, the spatial resolution will be about 15 m and the temporal resolution will be 7 day.

As shown in FIG. 9B, the multiple controllable valves 204 may be coupled to the control station 14 via gateways 206. With such a configuration, the control station 14 is provided as a master unit that is responsible for irrigation scheduling as well as other functionalities and the controllable valves 204 are slave elements subject to the control station 14. The gateways 206 may be provided as wired or wireless elements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method of operating a drip irrigation system, the method comprising:
    providing drip irrigation lines aside a diverter line with T-junctions interleaved between adjacent ones of the drip irrigation lines and each T-junction comprising:
        a three-way line coupled to the diverter line;
        a check valve operably disposable between the three-way line and a downstream end of an upstream one of the drip irrigation lines to permit fluid flow in only a forward direction from a downstream end of an upstream one of the drip irrigation lines to first, second and third legs of the three-way line; and
        a controllable valve operably disposable between the three-way line and an upstream end of a downstream one of the drip irrigation lines;
    opening each of the controllable valves of each T-junction to permit fluid flow in only the forward direction from the first, second and third legs of the three-way line to an upstream end of a downstream one of the drip irrigation lines; and
    closing each of the controllable valves of each T-junction to prevent the fluid flow in only the forward direction from the first, second and third legs of the three-way line to the upstream end of the downstream one of the drip irrigation lines.

2. The method according to claim 1, wherein the opening and closing is in accordance with a predefined schedule.

3. The method according to claim 2, wherein the predefined schedule is defined in accordance with a predefined temporal resolution.

4. The method according to claim 1, wherein the opening and closing is in accordance with current atmospheric conditions.

5. The method according to claim 1, further comprising forming the drip irrigation lines with uniform lengths.

6. The method according to claim 1, further comprising disposing the drip irrigation lines on both sides of the diverter line.

7. The method according to claim 6, further comprising disposing multiple T-junctions at similar axial locations along the diverter line.

8. The method according to claim 1, further comprising providing the controllable valve of each of the T-junctions with a solenoid valve.

9. The method according to claim 8, further comprising opening each of the solenoid valves to flush the system.

10. The method according to claim 8, further comprising coupling a control station to each of the solenoid valves.

11. The method according to claim 10, further comprising operating by the control station the solenoid valves in a closed loop configuration based on sensor feedback.

12. The method according to claim 10, further comprising acknowledging by each of the solenoid valves command receipt and reporting by each of the solenoid valves that a command was performed.

13. A method of operating a drip irrigation system, the method comprising:
providing drip irrigation lines aside a diverter line with a T-junction interleaved between the drip irrigation lines and the T-junction comprising:
- a three-way line having a first leg fluidly coupled to the diverter line, a second leg configured to be coupled to a downstream end of an upstream one of the drip irrigation lines and a third leg configured to be coupled to an upstream end of a downstream one of the drip irrigation lines;
- a check valve operably disposable between the three-way line and a downstream end of an upstream one of the drip irrigation lines to permit fluid flow in only a forward direction; and
- a controllable valve operably disposable between the three-way line and an upstream end of a downstream one of the drip irrigation lines; and operating the controllable valve in a first mode whereby the controllable valve permits fluid flow in only the forward direction from the first, second and third legs to the upstream end of the downstream one of the plurality of drip irrigation lines and in a second mode whereby the controllable valve prevents the fluid flow.

* * * * *